United States Patent
Corey

(10) Patent No.: US 9,810,404 B1
(45) Date of Patent: Nov. 7, 2017

(54) LASER WITH TWO LEVELS OF IMAGE ADJUSTMENT

(71) Applicant: Jim Breen, Chandler, AZ (US)

(72) Inventor: Carter Corey, Chandler, AZ (US)

(*) Notice: Subject to any disclaimer, the term of this patent is extended or adjusted under 35 U.S.C. 154(b) by 0 days.

(21) Appl. No.: 14/075,981

(22) Filed: Nov. 8, 2013

Related U.S. Application Data

(60) Provisional application No. 61/724,227, filed on Nov. 8, 2012.

(51) Int. Cl.
   *G02B 27/20* (2006.01)
   *F21V 14/00* (2006.01)

(52) U.S. Cl.
   CPC .................. *F21V 14/006* (2013.01)

(58) Field of Classification Search
   CPC ............... G02B 27/20; F21Y 2101/025; F41H 13/0056; G03B 21/26; F21V 17/02; F21L 2003/00; F21L 2001/00
   USPC ....... 362/118, 649, 650, 653, 259, 277, 280, 362/281, 806; 353/42
   See application file for complete search history.

(56) References Cited

U.S. PATENT DOCUMENTS

| | | | | |
|---|---|---|---|---|
| 5,450,148 A * | 9/1995 | Shu et al. | ........................ | 353/42 |
| 5,951,149 A * | 9/1999 | Lee | ........................ | G02B 27/20 |
| | | | | 362/205 |
| 6,022,126 A * | 2/2000 | Sekine | .................... | G02B 27/20 |
| | | | | 359/15 |
| 2001/0043313 A1* | 11/2001 | Okura | ............................ | 353/97 |
| 2003/0179804 A1* | 9/2003 | Cook | .................... | G02B 26/106 |
| | | | | 372/100 |
| 2009/0002992 A1* | 1/2009 | Dallas | ...................... | F21V 9/083 |
| | | | | 362/280 |
| 2009/0180283 A1* | 7/2009 | Chu | .............................. | 362/259 |
| 2015/0069216 A1* | 3/2015 | Hutchin | ................ | G01J 1/4257 |
| | | | | 250/201.9 |

* cited by examiner

*Primary Examiner* — Anh Mai
*Assistant Examiner* — Glenn Zimmerman
(74) *Attorney, Agent, or Firm* — Paul B. Heynssens; Attorney at Law PLC

(57) ABSTRACT

A laser lighting device configured to provide two levels of image adjustment. An end piece provides first range of motion along the longitudinal axis of the laser, and controls image size projected from the laser. The end piece also allows for a number of masks to be utilized with the laser so that the projected light may be projected in various images shapes. A cap piece is rotatable about the longitudinal axis of the laser and may create various patterns in the light being projected, such as spots sparkles, and other patterns, or fill textures to the projected image of variable size.

16 Claims, 7 Drawing Sheets

GOBO cap
300

502

504

500

Specs of light that may be configured and formed in different
patterns as produced by the Image Control Laser Light
-prior to installing the GOBO to provide an exterior shape

LASER WITH TWO LEVELS OF IMAGE ADJUSTMENT

CROSS-REFERENCE TO RELATED APPLICATION

This application claims the benefit of U.S. Provisional Patent Application No. 61/724,227 filed Nov. 8, 2012, the contents of which are hereby incorporated by reference.

TECHNICAL FIELD

This description relates generally to lighting and illumination and more specifically to decorative lighting devices.

BACKGROUND

Decorative lighting is often produced by incandescent bulbs, mounted in fixtures at predetermined locations. To achieve a desired lighting effect the lights must often be prearranged or installed to provide a given effect. The shape of the light is typically rounded, as produced by the inherent construction of an incandescent bulb. The light produced may be colored, but is typically uniform in illumination. As the desire to provide flexible decorative lighting increases, and to generally improve the appearance of decorative lighting, it may be desirable to produce adjustable decorative lights that produce patterns of light that may be adjusted, and also to provide adjustable shapes of light.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a laser lighting device that is configured to provide two levels of image adjustment. An end piece provides first range of motion along the longitudinal axis of the laser, and controls image size projected from the laser. The end piece also allows for a number of masks to be utilized with the laser so that the projected light may be projected in various image shapes. A cap piece is rotable about the longitudinal axis of the laser and may create various patterns in the light being projected, such as spots sparkles, and other patterns, or fill textures to the projected image of variable size.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a decorative laser lighting device. Although the present examples are described and illustrated herein as producing given shapes, and patterns of light those examples are merely illustrative and not limiting to the shapes and patterns of light that may be produced by the examples described herein. As those skilled in the art will appreciate, the present examples are suitable for application in a variety of different types of lighting systems such as indoor and outdoor decorative lighting, holiday lighting, advertising effects, and the like.

The laser with two levels of image adjustment typically includes an image control laser light producing device (produces scattered light spots that are adjustable), with a GOBO cap (that includes slides transparencies, cut outs or gratings, to produce image shapes that are adjustable in size) disposed over an end of the image control laser light that produces light.

Figure 1:
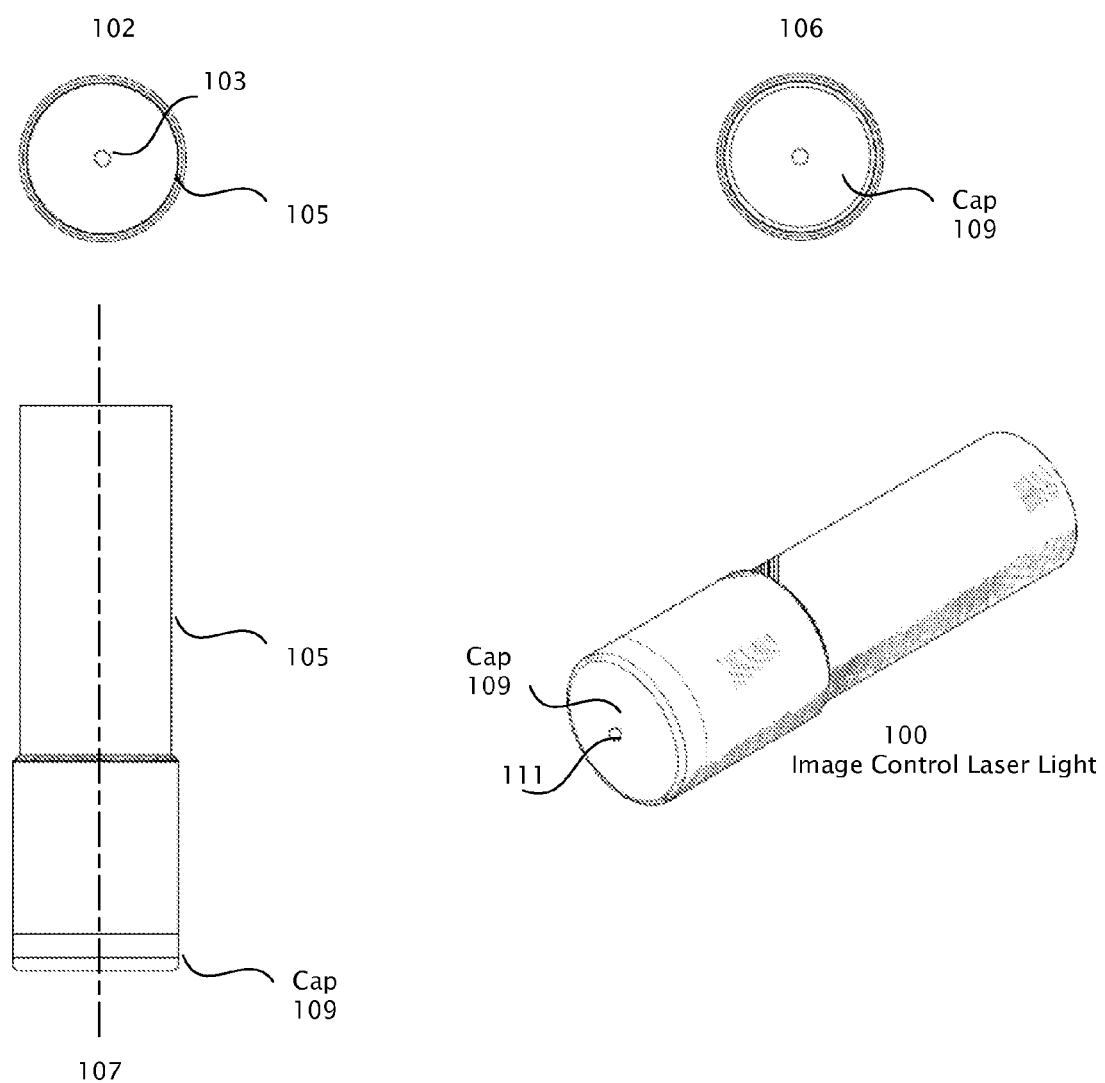
FIG. 1 shows an example of an Image Control Laser Light.

FIG. 1 shows an example of an image control laser lighting device 100, shown in a perspective view. Also shown are an end view 102, showing an aperture 103 in the housing 105 such that a power cord (not shown) may be coupled. The body 105 shown from a top view is roughly cylindrical in this example, and at its center forms an axis 107 along which coherent laser light may be emitted. Opposite end 106 shows the ratable cap 109 that turns about the axis 107 to achieve various visual effects.

The image control laser light 100 includes a formed housing 105 shaped as a square, round, or other shaped tubular structure typically closed at the ends. The structure may be metal plastic, or other equivalent material. The image control laser light can include two end pieces 102, 106 or parts, the rear or "the base" 102 and the front or "image control" 106. The base 102, or base casing, may be a tubular assembly with an end cap or closed end that provides protection and support to electrical and mechanical components disposed inside. In particular the base may include a laser light apparatus (not shown) and other circuitry (not shown) for producing the laser light emitting from aperture 111 along the long axis of the laser 107, while the image control 109 controls a displayed pattern of how the modified laser light will be viewed when projected on a typically solid surface.

Figure 2:
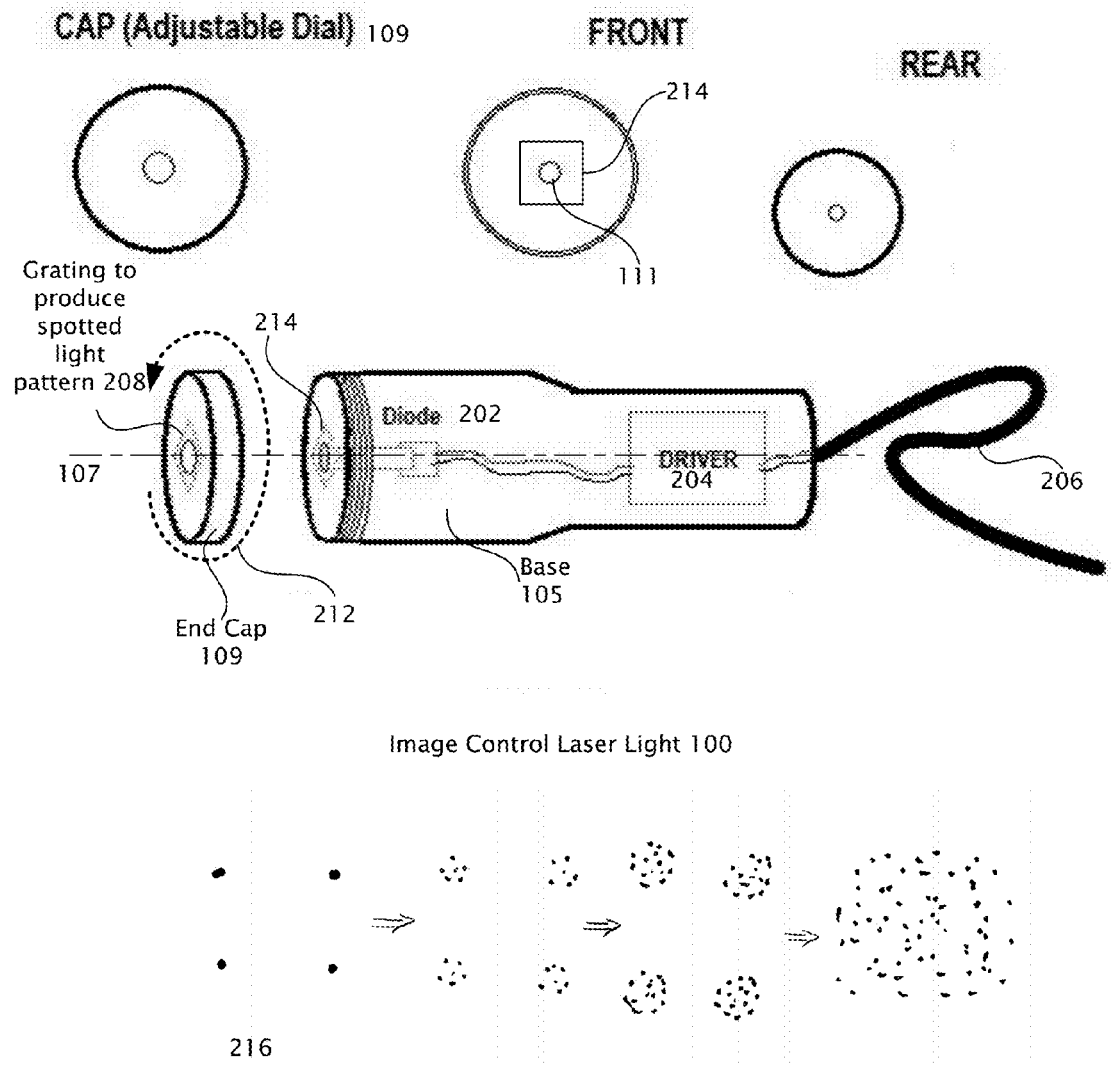
FIG. 2 shows an example of the internal components of an Image Control Laser Light.

FIG. 2 shows an example of the internal components of the image control laser lighting device 100. The image control laser light 100 typically utilizes 110 to 120 volt power, provided via cord 206. The power cord 206 may have a plug in type inverter disposed on or near the driver assembly 204 which converts the power from A/C to D/C power typically between 3 to 18 volts. The cord 206 typically couples to the driver assembly 204 at the rear, or base 102 of the device 100. The power cord 206 attaches to the base via a socket, or equivalently may be supplied as a "pig tail" that is not removable from the image control laser light by a user. Alternatively a power supply may be provided in a "power brick" incorporated into a wall plug, or in line along the length of the power cord so that DC is provided through the rear 102 of the laser 100.

The base has disposed therein: 1) A conventionally constructed driver circuit 204 for the regulation of power along with the control wiring. 2) A laser diode 202 to produce the beam of light, and which may be surrounded by shaped aluminum to dissipate the heat from the laser, or otherwise heat sunk. The heat sink (not shown) may be thermally coupled to the base. The laser light may exit the laser device 100 through a front aperture hole 111.

The front 210 of the laser through which laser light emanates, may have a filter, grating, image, or the like 214 fixedly attached to it, so that the laser light passes through it. In particular a conventional 2D diffraction grating may be placed in the path of the laser light to create visual effects as the mechanism is rotated.

An end cap 109 made from plastic, metal or equivalent materials may be coupled to the base housing by threads (or other equivalent fastening methods that allow the assembled cap 109 to be rotated), and may be rotated 201 about the longitudinal axis 107 of the base. The cap 109 also serves to couple it to the base case 105, and to adjust the lighting effect produced.

Filters, lenses diffraction gratings and the like 208 may be disposed in the end cap 109 and when assembled are protected within the housing to control and enhance the light from the laser 100. The adjustable dial and cap 109 provides image control and includes either fixed or interchangeable transparencies, gratings, or the like to convert a single laser beam into multiple, scattered individual specs of light, also known as diffraction.

With one or more diffraction gratings 208 disposed therein, the rotable end cap forms an adjustable dial to create multiple patterns of light speck sizes and positions when two conventional 2D diffraction gratings are rotated relative to each other. The locations and sizes of spots of light produced can vary based on which position the adjustable dial is in. For the example of rotating two 2D diffraction gratings relative to each other, as the dial is turned 212, the spots, dots or specs of light emanating from the aligned diffraction grating further divide, first into circular areas of multiple spots then further dividing and merging into adjacent areas of spots to produce various decorative light patterns. As the gratings are turned relative to each other to again align a grid of spots is again produced 216. In such an structure one 2D diffraction grating 212 may be fixedly disposed on the front 201, with the laser beam shining through it via aperture 111. A second 2D diffraction grating 208 is rotated relative to the first 212, so that a varying pattern of spots seeming to expand and then collapse into each other is produced.

The adjustable dial 109 is attached to the externally to the housing. This dial is typically manually controlled, without the use of any motors. The dial may be controlled by adjusting its threaded, or equivalent connection to the base, or alternatively may be provided with a dial mechanism that is adjusted independent of the cap's attachment to the case.

The assembly so produced may be used indoors or outdoors. However outdoor use typically calls for additional protection if the internal electronics against intrusion of moisture, dirt, dust and other contaminants. Also in outdoor use allowances in the design are typically made so that operation over a wider temperature range may be allowed.

In an alternative example the rotable cap 109, does not extend to the edge of the housing (105 of FIG. 1), but forms a small nub or dial protruding from the laser (100 of FIG. 1). Such a construction allows an additional protective cap (not shown) to thread onto the case. In this example the rotable cap 109 includes a 2D diffraction grating which may be adjusted as desired. The protective cap has an aperture for allowing the laser light to pass through un hindered but may also be fitted with additional filters, gratings or shaped apertures to additionally create decorative effects. Such an additional protective cap may also be called a GOBO.

Figure 3:
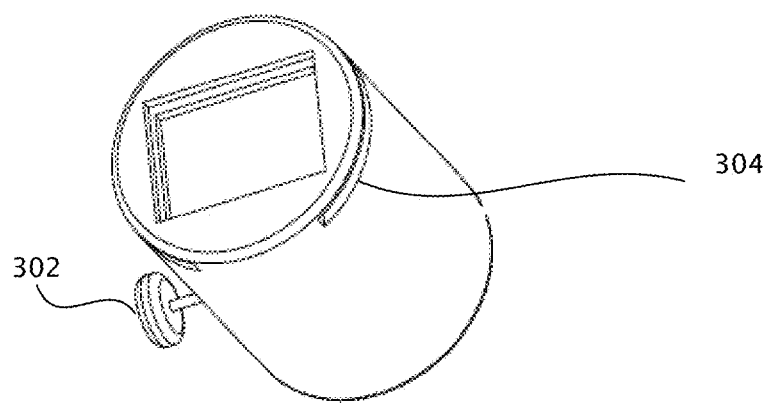
FIG. 3 shows an example of a GOBO cap.

FIG. 3 shows an example of a GOBO cap 300 into which filters, slides gratings and the like may be placed. The GOBO cap is the device which controls the shape of the scattered lighting spots by inserting a GOBO, ("GO Black-Out"). With the GOBO installed in the cap, the size of the image can be increased or reduced by sliding the GOBO holder forward or backward along the longitudinal axis of the laser (100 of FIG. 1). The position may be fixed by a thumb screw, setscrew or the like 302. Optionally a ridge in the mating Image control Laser device, may match a grove in the GOBO cap (or vice versa) to preserver the orientation of the image as its size is adjusted.

The GOBO cap includes a GOBO holder which is formed by a slot 304 at the front where the GOBO drops in manually. The exemplary GOBO's are a piece of black plastic which have an image cut out of the center of the rectangular or equivalently shaped slide. Examples of GOBO images are circle, triangle, star, cross and the like. By controlling the shape of the scattered light, one can position a laser light pattern on a solid surface and the image may be adjusted to show without having to move the light source.

Figure 4:
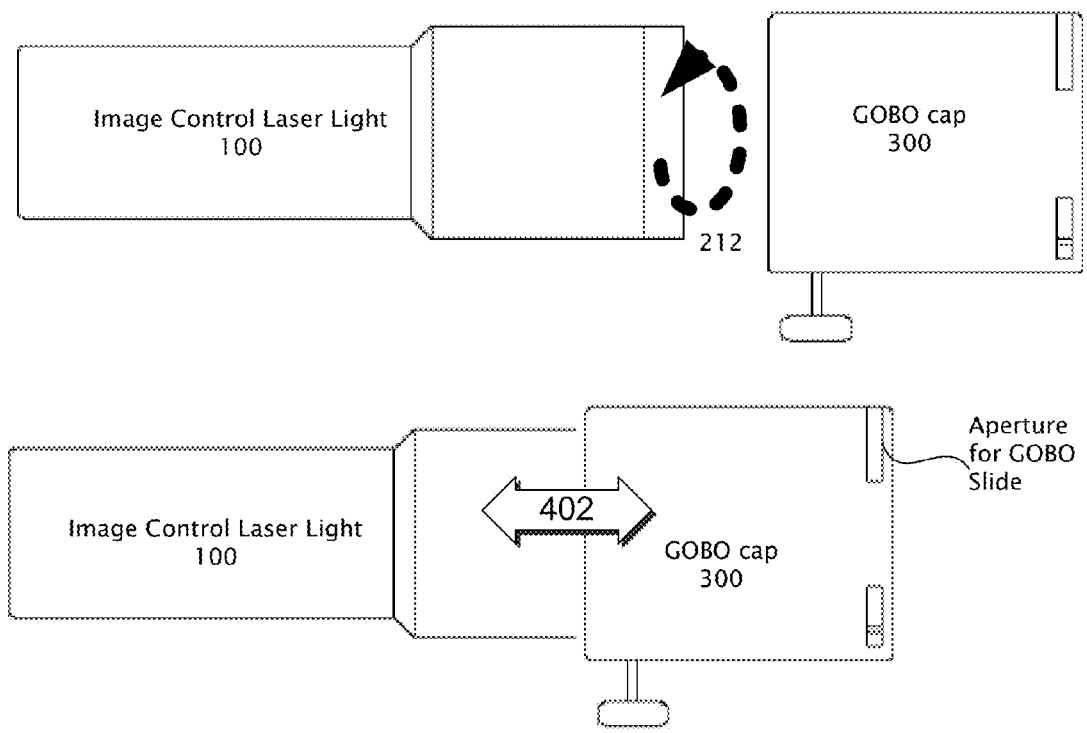
FIG. 4 shows an Image Control Laser Light with a GOBO cap.

FIG. 4 shows an image control laser light with a GOBO cap 300 showing two levels of adjustment. The Gobo via it's holder may be positioned via rotation 212, or by sliding it in and out 402 to shape the light. A gobo may be disposed in aperture 304. However in an alternative example a gobo holder may be threadably coupled to the laser 100 so that the two levels of adjustment may be achieved through the threaded coupling. In such an example an additional grating may be disposed internal to the GOBO cap so that paired gratings may be disposed to produce various patterns of light independent of the rotation of the GOBO in it's cap.

Figure 5:
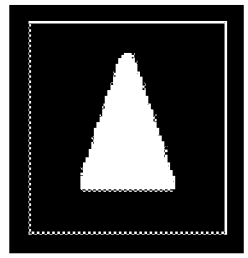
FIG. 5 shows two examples of GOBO slides.
Figure 5:
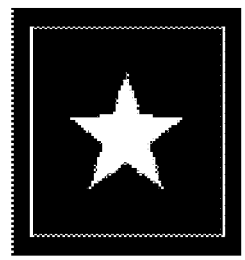

FIG. 5 shows two examples of GOBO slides 500. Typically the GOBO looks like a stencil, or transparency the selectively blocks light to project various outline shapes onto walls, screens, or other objects. Here a triangle, or Christmas tree shape 502 is shown with a star shaped stencil 504.

Figure 6:
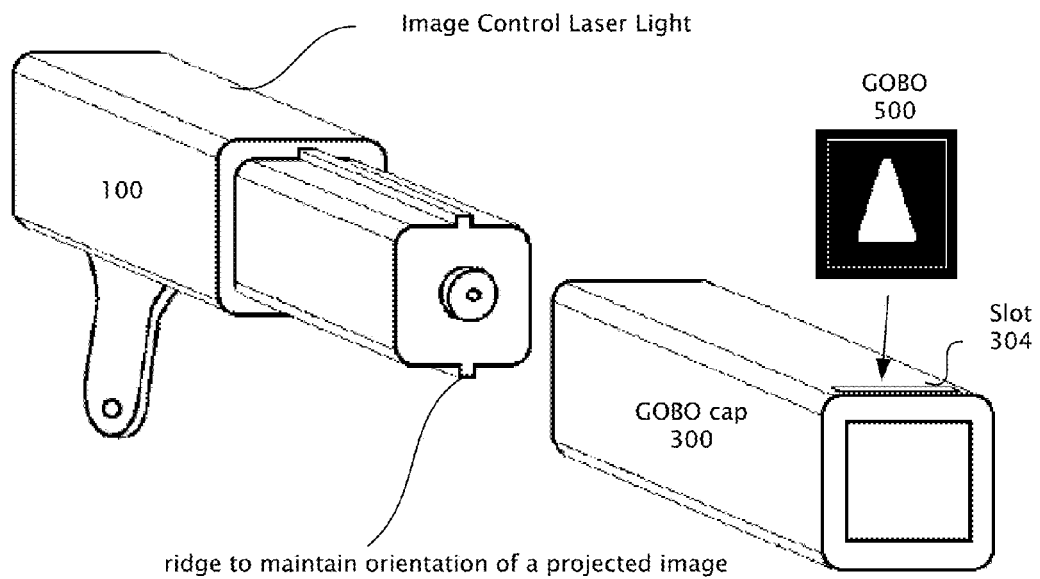
FIG. 6 shows an alternative example of an Image Control Laser Light with a GOBO cap having a ridge to maintain orientation of a projected image.
Figure 6:
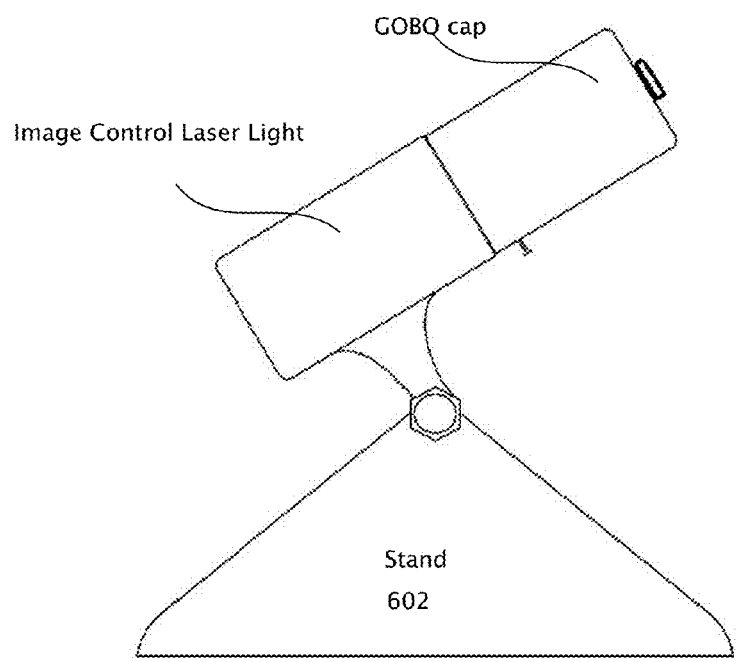

FIG. 6 shows an alternative example of an image control laser light 100 with a GOBO cap 300 having a ridge to maintain orientation of a projected image. GOBO 500 is inserted in slot 304 in the cap 300 to shape the light outline. The device may be equipped with a stand 602 so that the device may be conveniently positioned toe project the lighting effects.

Figure 7:
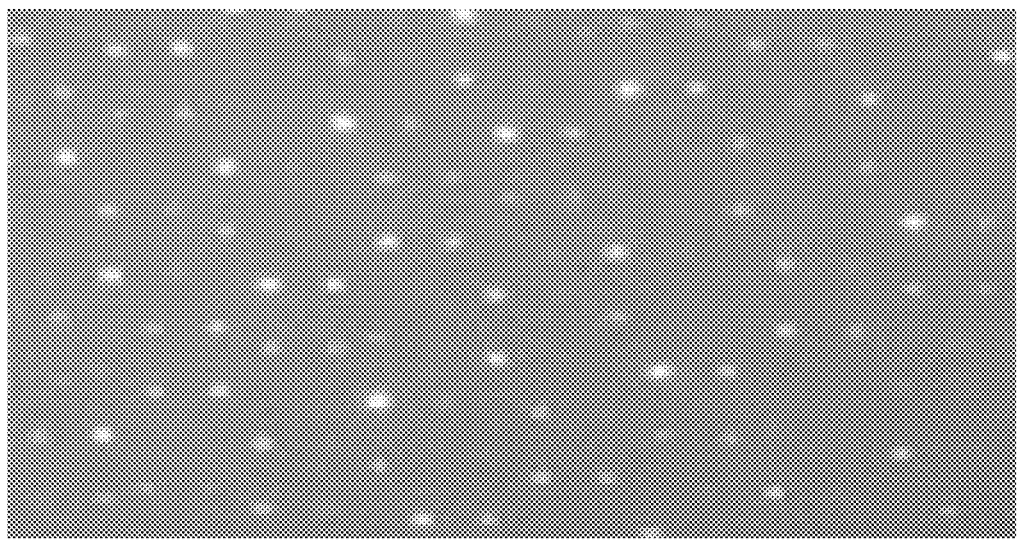
FIG. 7 shows speckled light patterns produced by the Image Control Laser Light, prior to installing the GOBO to provide an exterior outline.

FIG. 7 shows speckled light patterns produced by the image control laser light system, prior to installing the GOBO to provide an exterior outline. The pattern may be varied as diffraction gratings in the device are rotated relative to each other.

The invention claimed is:

1. A decorative laser device comprising:
   a laser device emitting a beam of coherent light; and
   a beam modification device disposed substantially perpendicular to, and in the path of the beam of coherent light, and adjustably coupled to the laser device to produce a decorative light, the beam modification device having a slot to removably receive a slide with an image to produce a desired decorative light, the beam modification device providing two levels of adjustment to the decorative light, wherein a first level of adjustment provides rotation of the decorative light by a continuously rotatable front piece, and the second level of adjustment is provided by a longitudinal sliding mechanism that provides continuously variable adjustment of a size of the decorative light.

2. The decorative laser device of claim 1, in which a first level of adjustment of the two levels of adjustment allows movement of the beam modification device along an axis of the coherent light emitting from the laser device.

3. The decorative laser device of claim 1, in which a second level of adjustment of the two levels of adjustment allows movement of the beam modification device rotatably about an axis of the coherent light emitting from the laser device.

4. The decorative laser device of claim 1, in which the beam modification device is rotatably, and slidably coupled to the laser device.

5. The decorative laser device of claim 1, in which the beam modification device is threadably coupled to the laser device.

6. A laser device comprising:
   a laser device having a cylindrical shaped body including a long axis of the cylindrical shaped body along which a laser light is emitted, and having a first diffraction grating disposed in a path of the light, and fixed in position relative to the light; and
   an tubular shaped end cap axially and slidably coupled about the long axis, and rotatably coupled about the long axis to the cylindrical shaped body, the tubular shaped end cap including at one end a second diffraction grating disposed in the path of the light, and in rotatable relationship to the laser light, whereby adjustment of an orientation of a pattern, and a size of the diffraction pattern produced by an interaction of the laser light on the first and second diffraction pattern may be adjusted.

7. The laser device of claim 6 further comprising a set screw disposed in a tubular area of the tubular shaped end cap whereby adjustment of the set screw allows the position of the tubular end cap relative to the laser device to be maintained.

8. The laser device of claim 6 further comprising:
   a slot disposed in the tubular shaped end cap formed parallel to the second grating; and
   an opaque slide including a cut out shape positioned in the path of the laser light and the light pattern produced by an interaction of the first and second diffraction gratings such that the light pattern has an outline corresponding to the cut out shape.

9. The laser device of claim 6 further comprising a stand coupled to the cylindrical shaped body whereby the laser device may be positioned.

10. The laser device of claim 6 in which the cylindrical body includes a front circular protrusion on which the first diffraction grating is disposed.

11. The laser device of claim 6 further comprising a filter disposed in the path of the laser light.

12. The laser device of claim 8 in which the opaque slide is disposed between the second diffraction grating and the laser device.

13. The laser device of claim 8 in which the opaque slide is disposed forward of the second diffraction grating and the laser device.

14. A laser device comprising:
    a laser device having a elongate shaped body including a long axis of the elongate shaped body along which a laser light is emitted, and having a first diffraction grating disposed in a path of the light and rotatably coupled to a reduced diameter protrusion extending from the elongate shaped body; and
    an end cap axially coupled about the long axis to the elongate shaped body, the end cap including at one end a second diffraction grating disposed in the path of the light, and in rotatable relationship to the laser light, whereby adjustment of an orientation of a pattern, and a size of the diffraction pattern produced by an interaction of the laser light on the first and second diffraction pattern may be adjusted.

15. The laser device of claim 14 in which the end cap is coupled to the elongate body by threads allowing the second grating to be rotated.

16. The laser device of claim 14 in which the end cap further comprises a grove on an inside surface which is slidably coupled to a matching ridge disposed on the elongate case.

* * * * *